S. H. BARNES.

Corset-Springs.

No. 5,216.

Reissued Jan. 7, 1873.

WITNESSES.

Wesley Elliot

A. E. Coles

Frances Lee Egbert

Executrix of S. H. Barnes

INVENTOR.

UNITED STATES PATENT OFFICE.

FRANCES LEE EGBERT, OF NEW YORK, N. Y., EXECUTRIX OF SAMUEL H. BARNES, DECEASED.

IMPROVEMENT IN CORSET-SPRINGS.

Specification forming part of Letters Patent No. 56,345, dated July 17, 1866; reissue No. 2,929, dated May 12, 1868; reissue No. 3,520, dated June 29, 1869; reissue No. 3,624, dated August 31, 1869; reissue No. 5,130, dated November 5, 1872; reissue No. 5,216, dated January 7, 1873.

*To all whom it may concern:*

Be it known that SAMUEL H. BARNES, deceased, of the city, county, and State of New York, during his lifetime did invent certain Improvements in Corset Steels or Springs; and I, FRANCES LEE EGBERT, of the same city, county, and State aforesaid, executrix, do hereby declare that the following is a full, clear, and exact description thereof.

This invention consists in forming the springs of corsets of two or more metallic plates placed one upon another, and so connected as to prevent them from sliding off each other laterally or edgewise, and at the same time admit of their playing or sliding upon each other in the direction of their length or longitudinally, whereby their flexibility and elasticity are greatly increased, while at the same time much strength is obtained and the springs rendered much more durable than the springs for corsets now in general use, as will be obvious from the following detailed description thereof, reference being had to the accompanying drawing.

*Drawing.*

Figure 1:
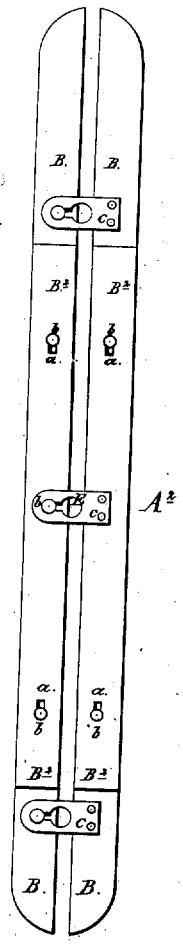
Figure 2:
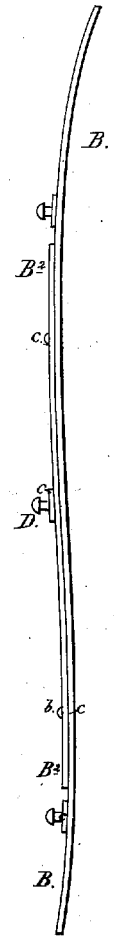

Figure 1 is a plan or side view of the two springs of a corset provided with clasps for combining them together in pairs and holding the corset in proper position upon the body of the person wearing it. Fig. 2 is an edge view of the same.

A $A^2$ represent a pair of corset-springs, each member of which pair is in the present case represented as composed of two metallic plates, B $B^2$, placed one upon the other, and there secured together by rivets, as at C and D. The plates in the member A are here shown as held one upon the other by the rivets that fasten the central clasp upon the springs, as at C, while the plates in the member $A^2$ are held one upon the other by the headed rivet, as at D, on which the clasp at C is interlocked by its eye E. At or near each end of the short plate $B^2$ of the two springs A $A^2$ are short slots *a* extending in the direction of their length, through which project the rounded ends or heads *b* of fixed pins *c* in the longer or under plate B, by means of which slots, as the corset-springs are bent, the plates constituting the same can play or move the one upon the other, the heads of the pins *c* preventing them from becoming disengaged—or, in other words, springing apart from each other or sliding off laterally.

As the great object is to so combine the plates as to prevent their slipping off each other laterally or edgewise, and at the same time admit of their playing or sliding upon each other longitudinally, any other means of combining the plates which will secure these results will be within the principle of this invention.

I therefore claim as the invention of the said SAMUEL H. BARNES, deceased—

1. A pair of corset-springs, each spring consisting of two or more metallic plates placed one on another, and so connected as to prevent them from sliding off each other laterally, and to admit of their playing or sliding on each other in the direction of their length.

2. A pair of corset-springs, each member of the pair being composed of two or more metallic plates placed one on another and fastened together at their centers, and so connected at or near each end that they can move or play on each other in the direction of their length.

3. A pair of corset-springs, each spring consisting of two or more metallic plates placed one on another, and so connected as to prevent them from sliding off each other laterally, and to admit of their playing or sliding on each other in the direction of their length, the pair being provided with a clasp or clasps, by which the two members of the pair can be connected and disconnected.

FRANCES LEE EGBERT, *Executrix.*

Witnesses:

WESLEY EGBERT,

N. E. COLES.